W. G. PALMER.
FRUIT BUCKET.
APPLICATION FILED MAR. 25, 1911.

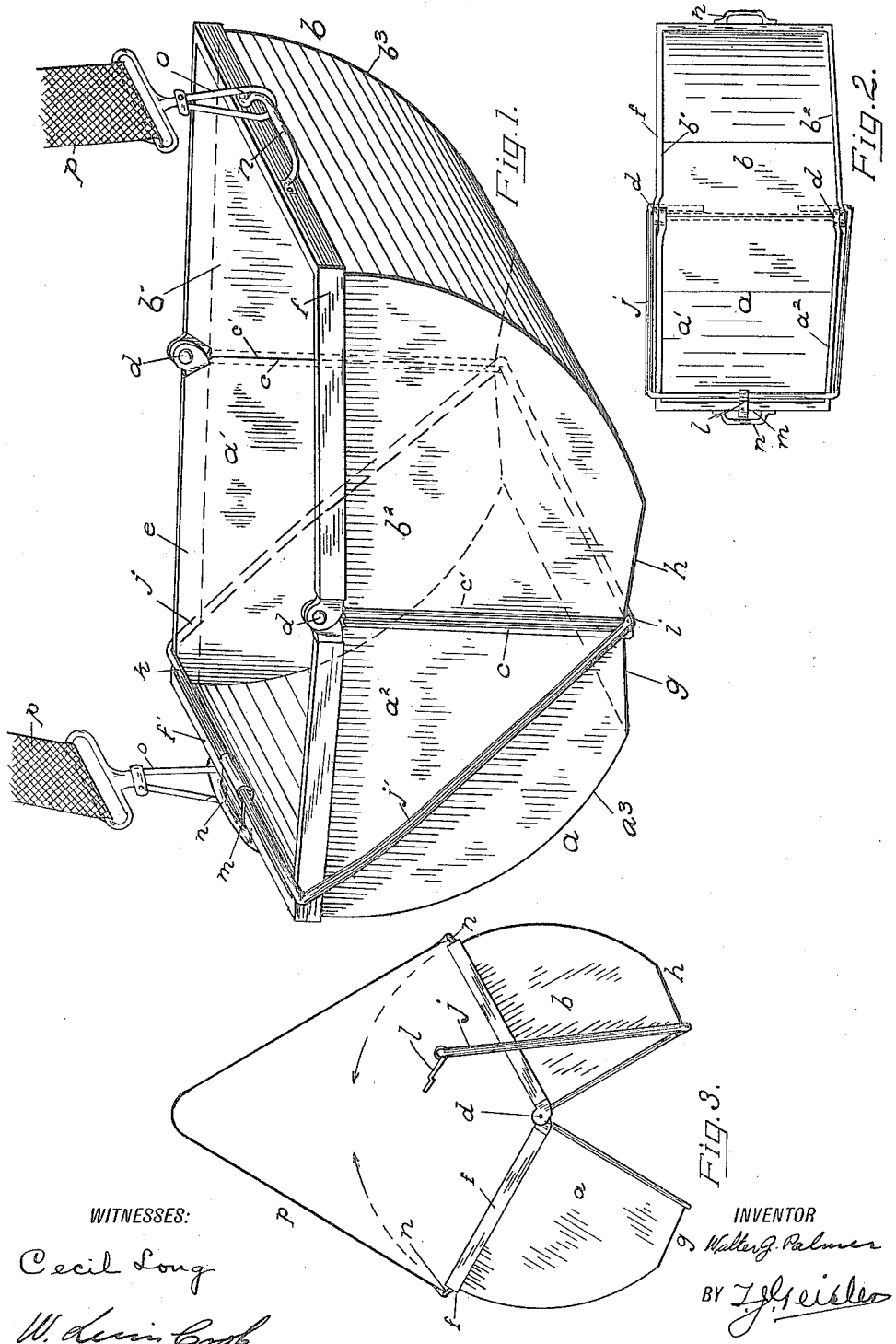

1,135,944.

Patented Apr. 13, 1915.
2 SHEETS—SHEET 2.

WITNESSES:
Cecil Long
W. Lewis Coop

INVENTOR
Walter G. Palmer,
BY T. J. Geisler
ATTORNEY

THE NORRIS PETERS CO., PHOTO-LITHO., WASHINGTON, D. C.

UNITED STATES PATENT OFFICE.

WALTER G. PALMER, OF HOOD RIVER, OREGON.

FRUIT-BUCKET.

1,135,944. Specification of Letters Patent. Patented Apr. 13, 1915.

Application filed March 25, 1911. Serial No. 616,989.

*To all whom it may concern:*

Be it known that I, WALTER G. PALMER, a citizen of the United States, and a resident of Hood River, county of Hood River, State of Oregon, have invented a new and useful Improvement in Fruit-Buckets, of which the following is a specification.

This invention has for its object to obtain a bucket made of metal, and consisting of two half-parts or sections so hinged together at the center and the top that the two halves of the bucket may be opened at the bottom in order to so gently discharge the fruit that all danger of bruising the latter will be eliminated.

My invention further has for its object to so adapt the shape of the bucket that it will have a tendency to spread out the fruit while being emptied into the box in which it is to be carried away.

My invention further has for its object to so contrive the bucket that when not in use it may be arranged into a shape convenient for nesting buckets in stacks of two or more.

My invention also includes other features having for their particular purpose convenience, economy in manufacture and durability, which features are hereinafter more fully set forth.

Figure 4:
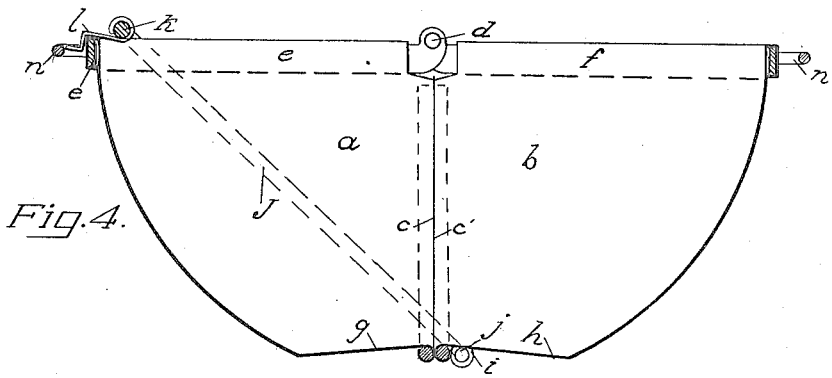
Figure 6:
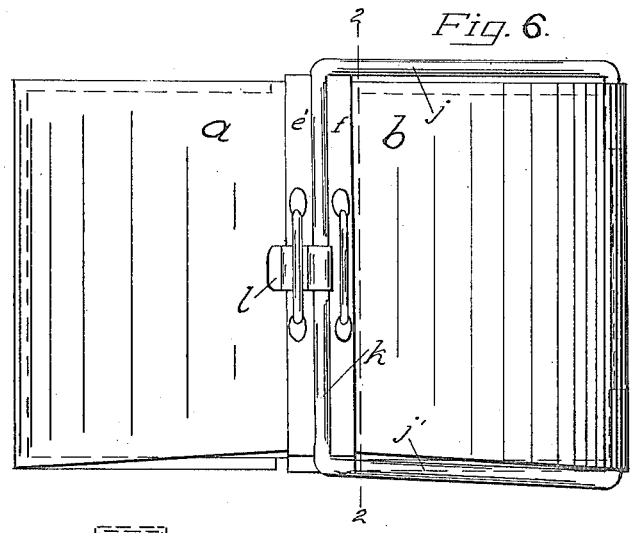
Figure 5:
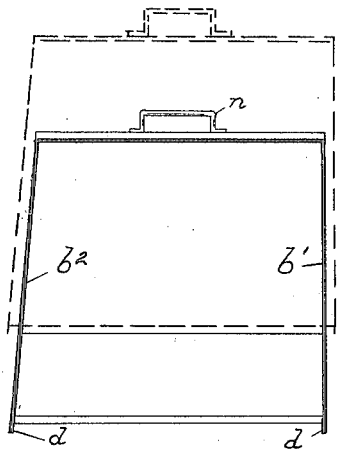

In the drawings: Figure 1 is a perspective view of my bucket arranged in its fruit-receiving state; the bucket being also represented as supported from the ends of a shoulder strap; Fig. 2 is a smaller-scale top view of my bucket arranged as shown in preceding view; Fig. 3 shows my bucket as opened on its hinges, as in the act of discharging its contents; Fig. 4 is a longitudinal section of my bucket arranged as shown in Fig. 1; Fig. 5 refers to my bucket as arranged in its nesting state, and shows a diagrammatic, inverted, cross-section on a line 2—2 of Fig. 6, also illustrating the nesting in stacks of two or more of my buckets; and Fig. 6 is an inverted or bottom view of my bucket arranged for nesting.

The body of my bucket comprises two half-parts or sections, $a$, $b$, the two halves being hinged together at their upper inner corners by rivets $d$, and the inner edges of the bottom and sides being adapted to fit neatly together when in abutment, as at $c$, $c'$. At the top rim the two halves are reinforced by bands of metal, $e$, $f$, so as to give the top rims greater rigidity, and the abutting edges, at $c$, $c'$, are also reinforced by wired seams, in the manner common to this type of construction. The two halves, $a$, $b$, are made with an outward curve, as at $a^3$ $b^3$, from the bottom toward the top at their outer ends, and the surfaces of the bottom of the two halves are so formed or adapted—as, for example, by forming the bottom with surfaces like $g$, $h$—as to provide a base adapted for supporting the bucket in upright position.

The rear sides, $a'$, $b'$, of the two half-parts, $a$, $b$, lie in the same vertical plane, but the sides, $a^2$, $b^2$, slope outward at the top in angular planes converging at the middle, as shown by the top view Fig. 2. By reason of this construction, when my bucket is arranged in its receiving state, as shown in Fig. 1, it will be wider across the center than at the ends, as apparent from the top view Fig. 2. This construction has a tendency, when the bucket is opened by separating the two halves on their hinges, to cause the fruit to be discharged somewhat laterally, and thus to be more or less evenly distributed and spread out in the box in which it is to be carried. The same structural feature is also important to facilitate the nesting of my bucket in stacks of two or more, so as to render convenient the shipment from the factory to the consumer, and also to minimize the space required for the storage of the buckets when not in use; for when the two half-parts, $a$, $b$, are arranged to bring their top rims into abutment, the sides $a^2$, $b^2$ of the bucket may be sprung out at the top so as to assume the shape illustrated by the diagrammatic section Fig. 5, thus permitting the nesting of one bucket in another, as also diagrammatically illustrated in Fig. 5.

At the inner lower corner, $i$, of one half-part of the bucket is hinged a bail $j$, formed at the top with an integral cross bar $k$, on which is a rigid latch-bar $l$, adapted to be locked with the end top rim $e'$ of the part $a$, as shown at $m$ in Fig. 1. The two half-parts, $a$, $b$, are provided with exterior ears, $n$, $n$, to which to fasten the snap-hooks, $o$, attached to the ends of a shoulder strap $p$.

When my bucket is arranged for nesting, the ears, $n$, $n$, will be brought to the top, as shown in Fig. 5, and when so arranged (as shown in Fig. 6) the latch-bar, $l$, on the cross-bar $k$ of the bail $j$, will be located between the ears, and may again be locked with the reinforcing rim-member $e'$ of the half-part, *a*, so as to secure the two half-parts against opening on their hinges. The mode in which my bucket is manipulated, when emptying the fruit, or other contents, is illustrated in Fig. 3.

The bucket is, in the first instance, set on the floor of the box into which it is to be emptied, the locking bail is then unlatched, and finally the ears, *n, n,* are seized and the bucket is slowly lifted, allowing the contents to roll out into the box.

I claim:

1. A bucket consisting of two parts, hinges connecting such parts at the upper inner corners of their sides, such hinges being adapted to permit the two parts to be lifted on their hinges and thus place the top rims of the two parts in abutment, the related side portions of one side of the bucket being formed with an outward slope toward the hinge axis of that side, a bail hinged to one of the parts of the bucket at the bottom, and means on the cross bar of such bail for locking the same to the top rim of the other part of the bucket.

2. A bucket consisting of two parts, hinges connecting such parts at the upper inner corners of their sides, such hinges being adapted to permit the two parts to be lifted on their hinges and thus place the top rims of the two parts in abutment, the related side portions of one side of the bucket being formed with an outward slope toward the hinge axis of that side, a bail hinged to one of the parts of the bucket at the bottom, and a latch on the cross bar of the bail engaging with the top rim of the other part of the bucket.

WALTER G. PALMER.

Witnesses:
  CECIL LONG,
  W. LEWIS COOP.

Copies of this patent may be obtained for five cents each, by addressing the "Commissioner of Patents, Washington, D. C."